US012006730B2

(12) United States Patent
Von Matern et al.

(10) Patent No.: US 12,006,730 B2
(45) Date of Patent: Jun. 11, 2024

(54) ACTUATING DEVICE FOR LOCK DEVICE, AND LOCK DEVICE

(71) Applicant: ASSA ABLOY AB, Stockholm (SE)

(72) Inventors: Johan Von Matern, Täby (SE); Daniel Skarp, Sundbyberg (SE)

(73) Assignee: ASSA ABLOY AB, Stockholm (SE)

( * ) Notice: Subject to any disclaimer, the term of this patent is extended or adjusted under 35 U.S.C. 154(b) by 352 days.

(21) Appl. No.: 17/424,813

(22) PCT Filed: Jan. 28, 2020

(86) PCT No.: PCT/EP2020/051961
§ 371 (c)(1),
(2) Date: Jul. 21, 2021

(87) PCT Pub. No.: WO2020/160956
PCT Pub. Date: Aug. 13, 2020

(65) Prior Publication Data

US 2022/0106813 A1 Apr. 7, 2022

(30) Foreign Application Priority Data

Feb. 8, 2019 (EP) .................................... 19156180

(51) Int. Cl.
*E05B 47/00* (2006.01)
*E05B 13/10* (2006.01)
*G07C 9/00* (2020.01)

(52) U.S. Cl.
CPC ........ *E05B 47/0001* (2013.01); *E05B 13/101* (2013.01); *G07C 9/00563* (2013.01);
(Continued)

(58) Field of Classification Search
CPC ....... E05B 47/00; E05B 47/0001-0005; E05B 13/00; E05B 13/10; E05B 13/101;
(Continued)

(56) References Cited

U.S. PATENT DOCUMENTS 3,733,861 A * 5/1973 Lester ................ G07C 9/00944 70/277
5,265,452 A * 11/1993 Dawson .............. E05B 47/0688 70/277
(Continued)

FOREIGN PATENT DOCUMENTS

CN 101360881 2/2009
CN 107847938 3/2018
(Continued)

OTHER PUBLICATIONS

Extended Search Report for European Patent Application No. 19156180.2, dated Aug. 6, 2019, 9 pages.
(Continued)

*Primary Examiner* — Nathan Cumar
(74) *Attorney, Agent, or Firm* — Schwegman Lundberg & Woessner, P.A.

(57) ABSTRACT

An actuating device (10) for actuating a lock device (12), the actuating device (10) comprising an actuating element (14) rotatably arrangeable with respect to a stationary structure (22) for rotation about an actuation axis (28); an electric generator (16) In fixed with respect to the actuating element (14) for common rotation with the actuating element (14); a drive member (18) connected to the actuating element (14) and arranged to drive the electric generator (16), the drive member (18) being arrangeable to be driven by engaging the stationary structure (22) and by manually rotating the actuating element (14); and an electromechanical coupling device (20) fixed with respect to the actuating element (14) for common rotation with the actuating element (14), and arranged to be electrically powered by the electric generator (16), the coupling device (20) being configured to adopt a decoupling state and a coupling state. A lock device (12) is also provided.

16 Claims, 1 Drawing Sheet

(52) U.S. Cl.
CPC ................. *E05B 2047/0016* (2013.01); *E05B 2047/0062* (2013.01); *G07C 2009/00634* (2013.01)

(58) Field of Classification Search
CPC ...... E05B 2047/0014–0017; E05B 2047/0062; G07C 9/00; G07C 9/00563; G07C 2009/00634; G07C 2009/00642
USPC ............................................................ 70/280
See application file for complete search history.

(56) References Cited

U.S. PATENT DOCUMENTS

| | | | | |
|---|---|---|---|---|
| 2009/0211319 | A1 * | 8/2009 | McCormack | E05B 47/068 70/277 |
| 2012/0111072 | A1 * | 5/2012 | Pukari | G07C 9/00309 70/279.1 |
| 2018/0202193 | A1 | 7/2018 | Piirainen et al. | |

FOREIGN PATENT DOCUMENTS

| | | | | |
|---|---|---|---|---|
| DE | 19612156 | | 10/1997 | |
| DE | 19829927 | | 1/2000 | |
| DE | 19829927 | A1 * | 1/2000 | E05B 47/0676 |
| DE | 102004041518 | | 9/2005 | |
| DE | 102004052802 | | 4/2006 | |
| DE | 102014105432 | | 10/2015 | |
| EP | 1808816 | | 7/2007 | |
| FR | 2728613 | | 6/1996 | |

OTHER PUBLICATIONS

International Search Report and Written Opinion for International (PCT) Patent Application No. PCT/EP2020/051961, dated Apr. 23, 2020, 13 pages.
Official Action with English Translation for China Patent Application No. 202080013177.9, dated Mar. 3, 2022, 16 pages.
International Preliminary Report on Patentability for International (PCT) Patent Application No. PCT/EP2020/051961, dated Aug. 19, 2021, 9 pages.

* cited by examiner

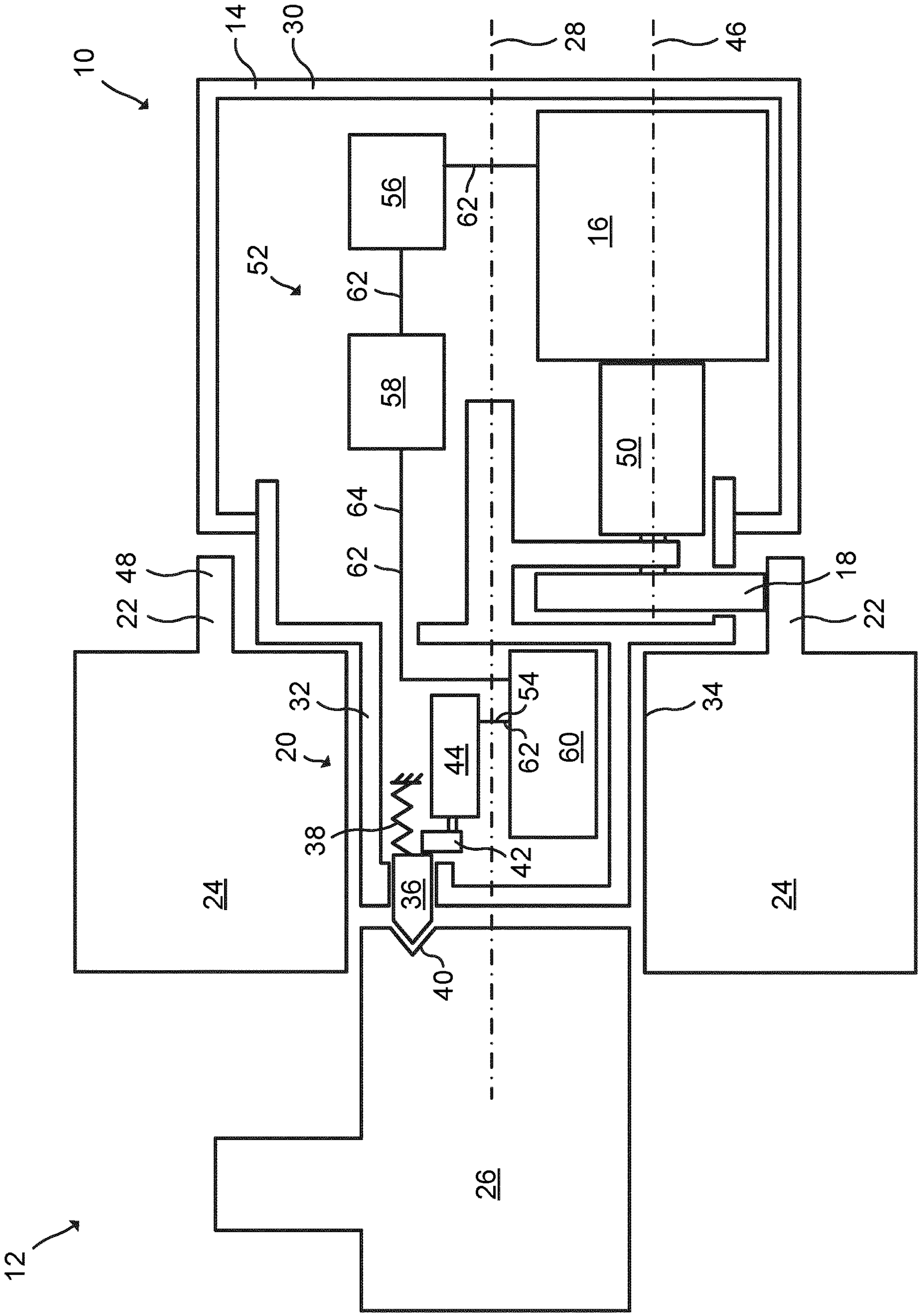
10
14
30
28
46
56
62
16
52
62
58
50
64
62
48
22
18
22
32
54
34
20
62
44
60
38
42
36
24
24
40
26
12

ACTUATING DEVICE FOR LOCK DEVICE, AND LOCK DEVICE

CROSS REFERENCE TO RELATED APPLICATIONS

This application is a national stage application under 35 U.S.C. 371 and claims the benefit of PCT Application No. PCT/EP2020/051961 having an international filing date of Jan. 28, 2020, which designated the U.S., which PCT application claimed the benefit of European Patent Application No. 19156180.2 filed Feb. 8, 2019, the disclosure of each of which are incorporated herein by reference.

TECHNICAL FIELD

The present disclosure generally relates to an actuating device for a lock device. In particular, an actuating device for a lock device, which actuating device comprises an actuating element, an electric generator, a drive member and an electromechanical coupling device, and a lock device comprising such actuating device, are provided.

BACKGROUND

Some electromechanical lock cylinders comprise a cylinder housing, a locking member rotatably arranged in the cylinder housing, a rotatable knob and an electromechanical coupling device for selectively coupling the knob with the locking member. When a user has been authorized, the coupling device couples the knob and the locking member and the lock can be opened by turning the knob.

Some of these lock cylinders comprise a battery in the knob for powering the coupling device and electronics, such as credential evaluation electronics. However, the battery needs to be replaced regularly which is troublesome. It is also problematic if the battery is completely discharged.

In order to avoid the use of batteries, so-called "self-powered" lock cylinders have been proposed, where electricity is generated by a rotation of the knob and is used to power an electromechanical coupling device. This concept is also known as energy harvesting. However, such energy harvesting lock cylinders comprise sliding contacts and/or complex mechanics which add costs and complexity and reduce reliability.

DE 102014105432 A1 discloses an electromechanical lock cylinder comprising a cylinder housing, a knob, a clutch and an electromotor working as a generator.

FR 2728613 A1 discloses a lock comprising an external handle, a housing, an electromagnetic generator and an electrically operated clutch.

DE 19829927 A1 discloses an arrangement comprising a first actuating element, a housing, a generator, a gear and an electromagnetic clutch.

SUMMARY

One object of the present disclosure is to provide an actuating device for actuating a lock device, which actuating device has a simple design, e.g. requiring fewer mechanical components.

A still further object of the present disclosure is to provide an actuating device for actuating a lock device, which actuating device has a reliable design.

A still further object of the present disclosure is to provide an actuating device for actuating a lock device, which actuating device improves user experience, e.g. by avoiding the use of batteries that have to be changed.

A still further object of the present disclosure is to provide an actuating device for actuating a lock device, which actuating device has a compact, secure and/or flexible design.

A further object of the present disclosure is to provide an actuating device for actuating a lock device, which actuating device solves several or all of the foregoing objects in combination.

A still further object of the present disclosure is to provide a lock device comprising an actuating device, which lock device solves one, several or all of the foregoing objects.

According to one aspect, there is provided an actuating device for actuating a lock device, the actuating device comprising an actuating element rotatably arrangeable with respect to a stationary structure for rotation about an actuation axis; an electric generator fixed with respect to the actuating element for common rotation with the actuating element; a drive member connected to the actuating element and arranged to drive the electric generator, the drive member being arrangeable to be driven by engaging the stationary structure and by manually rotating the actuating element; and an electromechanical coupling device fixed with respect to the actuating element for common rotation with the actuating element, and arranged to be electrically powered by the electric generator, the coupling device being configured to adopt a decoupling state, for decoupling the actuating device from a locking member of the lock device, and a coupling state, for coupling the actuating device to the locking member.

When the coupling device adopts the coupling state, the locking member of the lock device can be rotated by rotating the actuating element. Thus, in the coupling state of the coupling device, the lock device can be locked or unlocked by rotating the actuating device.

When the coupling device adopts the decoupling state, rotation of the actuating element is not transmitted to rotation of the locking member. Thus, in the decoupling state of the coupling device, the lock device cannot be locked or unlocked by rotating the actuating device.

The electric generator can convert mechanical energy from a manual rotation of the actuating element to electric energy. Electric energy harvested by manually rotating the actuating element can thereby be used to authorize a user, to switch the coupling device from the locking state to the unlocking state, and to switch the coupling device back to the locking state after some time. The actuating device thus constitutes an energy harvesting actuating device. The electric generator may function as a primary energy source for the coupling device.

The electric generator electrically powers the coupling device when the electric generator moves, e.g. rotates. The electric generator moves in response to rotation of the actuating element. When the electric generator is at standstill, the electric generator may not electrically power the coupling device. The electric generator may however be electrically connected to the coupling device in any case. The electric generator is thus configured to electrically power the coupling device.

The electric generator and the coupling device are different components of the actuating device. According to one example, the electric generator does not act mechanically on the coupling device.

The drive member drives the electric generator when the drive member is driven, e.g. rotates. The electric generator moves in response to movement of the drive member. When the drive member is at standstill, also the electric generator may be at standstill. The drive member does not drive the electric generator if the drive member is at standstill. The drive member is thus configured to mechanically drive the electric generator.

When the drive member is engaged with the stationary structure, the drive member is arranged to be driven by manually rotating the actuating element. The drive member is thus configured to be driven by engaging the stationary structure and by manually rotating the actuating element.

Since the coupling device and the electric generator are independent components fixed with respect to the actuating element, and the coupling device is arranged to be electrically powered by the electric generator, several advantages are obtained or made possible. For example, energy harvesting by means of the actuating device can be accomplished without the need for complex mechanics or sliding contacts, and a more flexible design is enabled.

The entire actuating device may be rotatable about the actuation axis. The actuating element can be manually grabbed and rotated by the hand of a user.

The drive member may comprise a toothed gearing. In this case, also the stationary structure may comprise a toothed gearing for being engaged by the toothed gearing of the drive member. The drive member may comprise, e.g. be constituted by, a gear wheel. The stationary structure may comprise a gear wheel. In case the drive member and the stationary structure comprise gear wheels, these gear wheels may be either spur gears or bevel gears.

The electric generator may be spatially separated from the coupling device. The spatial separation enables the coupling device to be positioned in a distal end of the actuating device, which is more difficult to access for unauthorized tampering. The spatial separation further enables a simpler modification of the actuating device for use with different types of coupling devices.

The actuating element may comprise a knob. The knob may be hollow. The electric generator may be arranged inside the knob. Also the drive member may at least partially be arranged inside the knob. Thus, the energy harvesting unit may be provided in the knob.

The actuating device may further comprise a spindle fixed with respect to the actuating element. The spindle may be hollow. In case the actuating element also comprises a knob, the spindle may be referred to as a knob spindle.

The coupling device may be arranged inside the spindle. This improves the security and flexibility of the actuating device.

The drive member may be offset with respect to the actuation axis. Thereby, a free passage can be provided in the actuating device, e.g. between a hollow actuating element and a hollow spindle. Also the electric generator may be offset with respect to the actuation axis.

The drive member may be rotationally connected to the actuating element for rotation about a drive member axis. The actuation axis and the drive member axis may be parallel. The drive member axis may rotate about the actuation axis as the actuating element is rotated about the actuation axis.

The actuating device may further comprise a transmission arranged to transmit a driving movement of the drive member to a driving movement of the electric generator. The transmission may be a gear transmission comprising one or more intermediate gear wheels.

The actuating device may further comprise at least one electrical conductor, and the coupling device may be electrically connected to the electric generator via the at least one electrical conductor. The at least one electrical conductor may be constituted by an electrical cable. An electrical conductor may for example be provided between the electric generator and power management electronics, between the power management electronics and reading electronics, between the reading electronics and credential evaluation electronics, and between the credential evaluation electronics and an electric motor of the coupling device.

The coupling device may comprise a blocking member arranged to transmit a rotation of the actuating element to a rotation of the locking member when the coupling device adopts the coupling state, and arranged to allow relative rotation between the actuating element and the locking member when the coupling device adopts the decoupling state.

The coupling device may comprise a holder movable between a holding position, for holding the blocking member when the coupling device adopts the coupling state, and a release position, for releasing the blocking member when the coupling device adopts the decoupling state.

The coupling device may further comprise an electric motor arranged to move the holder between the holding position and the release position. In this way, the electric motor can be used to switch the coupling device between the decoupling state and the coupling state. If access is granted, the electric motor may be driven to switch the coupling device from the decoupling state to the coupling state. If access is denied, the electric motor may not be driven. According to one variant, the coupling device is switched from the coupling state to the decoupling state after a certain time limit, e.g. 10 seconds.

The coupling device may further comprise a biasing member, such as a compression spring, arranged to bias the blocking member towards the locking member, e.g. into a recess of the locking member. When the blocking member is biased into the recess, the electric motor can move the holder from the release position to the holding position. Thereby, the coupling device adopts the coupling state.

The actuating device may further comprise electronics arranged to be electrically powered by the electric generator and configured to produce an authorization signal, for switching the coupling device from the decoupling state to the coupling state, upon authorization of a user. The electronics may be arranged within the actuating device, e.g. inside the knob and/or the spindle.

The electronics may for example comprise power management electronics, reading electronics and credential evaluation electronics. The power management electronics is configured to manage the energy harvesting and to supply the coupling device with power. To this end, the power management electronics may comprise energy harvesting electronics, such as diodes for rectifying the voltage from the electric generator and a passive non-chemical electric energy storage device, such as a capacitor. Thereby, electric energy can be harvested from rotation of the actuating element in either direction about the actuation axis. According to one example, the electric energy storage device does not comprise a battery.

The reading electronics may comprise a receiving unit, such as an antenna, for receiving an input signal, and a reading unit. The reading electronics may be configured to send an access signal to the credential evaluation electronics. The credential evaluation electronics may be configured to determine whether or not authorization should be granted based on the access signal. If access is granted, e.g. if a valid credential is presented, the credential evaluation electronics may issue an authorization signal.

For example, the power management electronics and the reading electronics may be arranged inside the actuating element and the credential evaluation electronics may be arranged inside the spindle. The reading electronics may be arranged to communicate wirelessly with an external device, such as a mobile phone. The wireless communication may for example be carried out by means of BLE (Bluetooth Low Energy) or RFID (Radio Frequency Identification). As an alternative to wireless communication, a user may input a code to the reading electronics, for example via a keypad. If an authorization request is denied, the coupling device is not switched, i.e. remains in the decoupling state.

According to a further aspect, there is provided a lock device comprising an actuating device according to the present disclosure. The lock device may for example be a lock cylinder. In this case, the lock device constitutes a digital lock cylinder or an electromechanical lock cylinder. The lock device can replace various lock cylinders, for example a door lock, a padlock or a bike lock.

Since the electric generator can be driven by manually rotating the actuating element, the lock device may be said to constitute an energy harvesting lock device, such as an energy harvesting lock cylinder.

The lock device may further comprise a stationary structure. In this case, the actuating element may be rotatably arranged with respect to the stationary structure about the actuation axis, and the drive member may engage the stationary structure. The stationary structure may for example be provided on a cylinder housing.

The actuating element may be configured to rotate continuously about the actuation axis. Thereby, a seamless access can be provided.

BRIEF DESCRIPTION OF THE DRAWINGS

Further details, advantages and aspects of the present disclosure will become apparent from the following embodiments taken in conjunction with the drawings, wherein:

FIG. 1: schematically represents a cross-sectional side view of a lock device comprising an actuating device.

DETAILED DESCRIPTION

In the following, an actuating device for a lock device, which actuating device comprises an actuating element, an electric generator, a drive member and an electromechanical coupling device, and a lock device comprising such actuating device, will be described. The same reference numerals will be used to denote the same or similar structural features.

FIG. 1 schematically represents a cross-sectional side view of an actuating device 10 and a lock device 12 comprising the actuating device 10. The actuating device 10 is configured to actuate the lock device 12. The lock device 12 is here exemplified as a lock cylinder.

The actuating device 10 comprises an actuating element 14, an electric generator 16, a drive member 18 and an electromechanical coupling device 20. The lock device 12 comprises a stationary structure 22 formed on a cylinder housing 24 (which is also stationary) and a locking member 26. The locking member 26 is rotatably arranged in the cylinder housing 24.

The actuating element 14 is rotatably arranged with respect to the stationary structure 22 for rotation about an actuation axis 28. In FIG. 1, the entire actuating device 10 can be rotated continuously about the actuation axis 28 by manually grabbing and rotating the actuating element 14. The actuating device 10 may be permanently or detachably rotationally connected to the stationary structure 22.

In FIG. 1, the actuating element 14 is constituted by a knob 30. However, alternative types of actuating element 14 for being manually rotated in order to rotate the actuating device 10 about the actuation axis 28 are possible.

The actuating device 10 of this example further comprises a spindle 32. The spindle 32 is received in a cavity 34 of the cylinder housing 24. The spindle 32 is fixed with respect to the actuating element 14. In FIG. 1, the actuating element 14 is rigidly connected to the spindle 32. The spindle 32 of this example comprises a relatively narrow distal portion and a relatively wide proximal portion (not denoted).

The coupling device 20 is fixed with respect to the actuating element 14 for common rotation with the actuating element 14. The coupling device 20 of this example comprises a blocking member 36, and a biasing member 38, here exemplified as a compression spring, arranged to bias the blocking member 36 in a distal direction (to the left in FIG. 1) into a recess 40 of the locking member 26. The coupling device 20 further comprises a holder 42, and an electric motor 44 arranged to drive the holder 42. The coupling device 20 is configured to adopt a decoupling state, for decoupling the actuating device 10 from the locking member 26, and a coupling state, for coupling the actuating device 10 to the locking member 26. In FIG. 1, the coupling device 20 has adopted the coupling state.

When the coupling device 20 adopts the coupling state, the locking member 26 of the lock device 12 can be rotated by rotating the actuating element 14. Thus, in the coupling state of the coupling device 20, the lock device 12 can be locked or unlocked by rotating the actuating device 10.

When the coupling device 20 adopts the decoupling state, rotation of the actuating element 14 is not transmitted to rotation of the locking member 26. Thus, in the decoupling state of the coupling device 20, the lock device 12 cannot be locked or unlocked by rotating the actuating device 10.

The holder 42 is movable between a holding position, as shown in FIGS. 1, and a release position, under the control of the electric motor 44. In the coupling state of the coupling device 20, the blocking member 36 is held in the illustrated distal position in the recess 40 by the holder 42 in the holding position. When the actuating element 14 is rotated, the actuating device 10 and the locking member 26 rotate in common about the actuation axis 28. The blocking member 36 is thereby arranged to transmit a rotation of the actuating element 14 to a rotation of the locking member 26 when the coupling device 20 adopts the coupling state.

By moving the holder 42 from the illustrated holding position to the release position, the blocking member 36 is allowed to jump out of the recess 40 when the actuating device 10 is rotated. In this way, the coupling device 20 can adopt the decoupling state. The electric motor 44 can thereby be used to switch the coupling device 20 between the decoupling state and the coupling state.

As shown in FIG. 1, each of the spindle 32 and the actuating element 14 is hollow. The electric generator 16 is arranged inside the actuating element 14.

The coupling device 20 is arranged inside the spindle 32, except for the blocking member 36 which protrudes to the exterior of the spindle 32 at least in the distal position. The electric generator 16 is thereby spatially separated from the coupling device 20. As a possible alternative configuration, both the electric generator 16 and the coupling device 20 may be spatially separated inside the spindle 32.

The electric generator 16 is fixedly connected to the actuating element 14. Thus, the electric generator 16 is arranged to rotate in common with the actuating element 14 about the actuation axis 28. Also the electric generator 16 is offset with respect to the actuation axis 28.

Moreover, the drive member 18 is rotationally connected to the actuating device 10 for rotation about a drive member axis 46. The drive member 18 is thus arranged to rotate both about the drive member axis 46 relative to the actuating element 14 and about the actuation axis 28, when the actuating element 14 is manually rotated. The drive member axis 46 is thereby arranged to rotate about the actuation axis 28. As shown in FIG. 1, the actuation axis 28 and the drive member axis 46 are parallel and offset.

The drive member 18 of this example is constituted by a gear wheel comprising a toothed gearing and the stationary structure 22 comprises a toothed ring gear 48 engaged by the toothed gearing of the drive member 18. Alternative types of engagement, such as a friction engagement, are however possible.

As shown in FIG. 1, the drive member 18 is offset with respect to the actuation axis 28. Thereby, a free passage can be provided in the actuating device 10 between the hollow actuating element 14 and the hollow spindle 32. Any need for sliding contacts is consequently avoided which contributes to a more reliable design of the actuating device 10. An engagement point or section between the drive member 18 and the ring gear 48 of the stationary structure 22 is also offset with respect to the actuation axis 28.

The drive member 18 is arranged to drive the electric generator 16. To this end, the actuating device 10 of this example comprises a transmission 50, here exemplified as a gearbox comprising a plurality of gear stages, arranged to transmit a rotation of the drive member 18 about the drive member axis 46 to a driving movement of the electric generator 16, e.g. a rotation of a rotor (not shown) of the electric generator 16. As shown in FIG. 1, the drive member 18 is partially arranged inside the actuating device 10, except for a section of the drive member 18 that engages the stationary structure 22.

The actuating device 10 may further comprise an overload protection (not shown), such as a slip clutch, in order to protect the transmission 50 from violent rotations of the actuating element 14. The slip clutch may be arranged between the drive member 18 and the transmission 50.

The actuating device 10 further comprises electronics, generally indicated by reference numeral 52. The electronics 52 is arranged to be electrically powered by the electric generator 16. The electronics 52 is further configured to produce an authorization signal 54 upon authorization of a user. When the authorization signal 54 is received by the coupling device 20, the coupling device 20 switches from the decoupling state to the coupling state.

As illustrated in FIG. 1, the electronics 52 electrically connects the electric generator 16 to the coupling device 20. The electronics 52 of the example in FIG. 1 comprises power management electronics 56, reading electronics 58, credential evaluation electronics 60 and electrical conductors 62, here constituted by electrical cables. One electrical conductor 62 connects the electric generator 16 to the power management electronics 56, one electrical conductor 62 connects the power management electronics 56 to the reading electronics 58, one electrical conductor 62 connects the reading electronics 58 to the credential evaluation electronics 60, and one electrical conductor 62 connects the credential evaluation electronics 60 to the electric motor 44. The coupling device 20 is thereby arranged to be electrically powered by the electric generator 16.

In the specific configuration of FIG. 1, the power management electronics 56 and the reading electronics 58 are arranged inside the actuating element 14 and the credential evaluation electronics 60 is arranged inside the spindle 32. The power management electronics 56 of this example comprises energy harvesting electronics, such as diodes (not shown) and a capacitor (not shown). The reading electronics 58 of this example comprises an antenna (not shown) for receiving an input signal, and a reading unit (not shown).

When the actuating element 14 is manually grabbed and rotated by the hand of a user, the engagement between the drive member 18 and the stationary structure 22 causes the drive member 18 to be driven to rotate about the drive member axis 46 and the actuation axis 28. The electric generator 16 and harvests electric energy from the rotation of the actuating element 14.

When sufficient electric energy has been harvested by the electric generator 16, an authorization process is initiated. During the authorization process, the reading electronics 58 is powered by the power management electronics 56 and can for example communicate wirelessly with an external device, such as with a mobile phone via BLE. The reading electronics 58 receives a credential from the external device and sends an access signal 64, based on the credential, to the credential evaluation electronics 60.

The credential evaluation electronics 60 then determines whether or not access should be granted based on the access signal 64. If the authorization request is denied, the coupling device 20 is not switched, i.e. remains in the decoupling state. If the authorization request is granted, e.g. if a valid credential is presented, the credential evaluation electronics 60 issues an authorization signal 54 to the electric motor 44. When sufficient electric energy has been harvested by the further continuous rotation of the actuating element 14, the electric motor 44 is driven to switch the coupling device 20 from the decoupling state to the coupling state, in this case by locking the blocking member 36 in the recess 40 when the actuating device 10 becomes rotationally positioned such that the blocking member 36 is aligned with the recess 40 in the locking member 26.

The actuating element 14 can be continuously rotated about the actuation axis 28 during the authorization procedure. Electric energy harvested by manually rotating the actuating element 14 can thereby be used to authorize a user and to switch the coupling device 20 from the decoupling state to the coupling state. When the coupling device 20 has adopted the coupling state, the locking member 26 can be rotated by further rotation of the actuating element 14. Thus, the user can rotate the actuating element 14 continuously during the authorization process, the subsequent switching process of the coupling device 20, and the subsequent rotation of the locking member 26. Thereby, a seamless access is provided.

While the present disclosure has been described with reference to exemplary embodiments, it will be appreciated that the present invention is not limited to what has been described above. For example, it will be appreciated that the dimensions of the parts may be varied as needed.

What is claimed is:

1. An actuating device for actuating a lock device, the actuating device comprising:

an actuating element rotatably arrangeable with respect to a stationary structure for rotation about an actuation axis;

an electric generator fixed with respect to the actuating element for common rotation with the actuating element about the actuation axis;

a drive member connected to the actuating element and arranged to drive the electric generator, the drive member being arrangeable to be driven by engaging the stationary structure and by manually rotating the actuating element; and an electromechanical coupling device fixed with respect to the actuating element for common rotation with the actuating element about the actuation axis, and arranged to be electrically powered by the electric generator, the coupling device being configured to adopt a decoupling state, for decoupling the actuating device from a locking member of the lock device, and a coupling state, for coupling the actuating device to the locking member.

2. The actuating device according to claim 1, wherein the electric generator is spatially separated from the coupling device.

3. The actuating device according to claim 1, wherein the actuating element comprises a knob.

4. The actuating device according to claim 3, wherein the electric generator is arranged inside the knob.

5. The actuating device according to claim 1, further comprising a spindle fixed with respect to the actuating element.

6. The actuating device according to claim 5, wherein the coupling device is arranged inside the spindle.

7. The actuating device according to claim 1, wherein the drive member is offset with respect to the actuation axis.

8. The actuating device according to claim 1, wherein the drive member is rotationally connected to the actuating element for rotation about a drive member axis.

9. The actuating device according to claim 1, further comprising a transmission arranged to transmit a driving movement of the drive member to a driving movement of the electric generator.

10. The actuating device according to claim 1, further comprising at least one electrical conductor, and wherein the coupling device is electrically connected to the electric generator via the at least one electrical conductor.

11. The actuating device according to claim 1, wherein the coupling device comprises a blocking member arranged to transmit a rotation of the actuating element to a rotation of the locking member when the coupling device adopts the coupling state, and arranged to allow relative rotation between the actuating element and the locking member when the coupling device adopts the decoupling state.

12. The actuating device according to claim 11, further comprising a holder movable between a holding position, for holding the blocking member when the coupling device adopts the coupling state, and a release position, for releasing the blocking member when the coupling device adopts the decoupling state.

13. The actuating device according to claim 1, further comprising electronics arranged to be electrically powered by the electric generator and configured to produce an authorization signal, for switching the coupling device from the decoupling state to the coupling state, upon authorization of a user.

14. A lock system comprising the lock device and the actuating device according to claim 1.

15. The lock system according to claim 14, further comprising a stationary structure, wherein the actuating element is rotatably arranged with respect to the stationary structure about the actuation axis, and wherein the drive member engages the stationary structure.

16. The lock system according to claim 14, wherein the actuating element is enabled to rotate continuously about the actuation axis.

* * * * *